UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

TRIBROMO DERIVATIVES OF INDIGO AND PROCESS OF MAKING SAME.

No. 856,687.　　　Specification of Letters Patent.　　　Patented June 11, 1907.

Application filed March 23, 1907. Serial No. 364,019.

*To all whom it may concern:*

Be it known that I, GADIENT ENGI, doctor of philosophy and chemist, a citizen of the Swiss Republic, and a resident of Basel, Switzerland, have invented new and useful Tribromo Derivatives of Indigo and a Process of Making the Same, of which the following is a full and exact specification.

Hitherto tribromo derivatives of indigo are not known. I have found that such tribromo substitution products of indigo are produced in an extremely smooth manner and with substantially quantitative yield by treating indigo or its mono- and di-bromo derivatives with suitable proportion of bromin at a raised temperature in presence of appropriate solvents or of appropriate media in which the material may be suspended. The new tribromo derivatives of indigo thus obtained are extremely valuable dyestuffs on account of their tinctorial properties, for they can easily be made into vats by the usual methods and dye cotton without a mordant clear blue tints, which are considerably more vivid and of a greener shade than the tints obtained by means of indigo or its known mono- or di-bromo derivatives; moreover, as compared with the latter, they are considerably faster to washing and chlorin.

The manufacture of these new tribromo derivatives of indigo is illustrated by the following examples.

Example I. 5 parts of indigo are suspended in 50 parts of nitrobenzene, 11-12 parts of commercial bromin are added and the mixture is heated gradually in a reflux apparatus until, in the course of $\frac{3}{4}$ hours, it boils gently; the temperature of the oil bath in which the containing vessel is heated may finally be 220-225° C. Much hydrogen bromid is evolved and the product of the reaction gradually separates as well formed crystals. After heating for another $1\frac{1}{2}$ hours, the whole is cooled, the brominated product, which has separated almost quantitatively, is drained, washed with alcohol and dried; it then forms a violet-brown crystalline powder and is a tribromindigo, $(C_{16}H_7O_2N_2Br_3)$. It dissolves in concentrated sulfuric acid with a greenish blue coloration, and in fuming sulfuric acid containing 24 per cent $SO_3$ with a deep blue coloration. On pouring this latter solution into ice-water greenish blue flocks separate. It is sparingly soluble in cold ani in and cold nitrobenzene to a blue solution, but dissolves somewhat more in hot anilin and hot nitrobenzene, the solution in nitrobenzene being bluish-violet and the solution in anilin showing a blue coloration. It is very sparingly soluble in chloroform to a greenish blue solution. When treated with alkaline reducing agents it yields easily and smoothly a greenish-yellow vat, from which cotton without a mordant is dyed vivid blue tints, fast to washing and chlorin and becoming still more pure and faster to chlorin after a short soaping at 60° C.

In the foregoing example another suitable substance such as glacial acetic acid, dichloro- or trichlorobenzene or ortho-nitrotoluene may be substituted for nitrobenzene.

Example II. 5 parts of indigo, 50 parts of ortho-nitrotoluene and about 16 parts of bromin are heated together in a reflux apparatus in an oil bath, the temperature of the latter being gradually raised to 180° C.; much hydrogen bromid is evolved and after continuing to heat at this temperature for about $\frac{1}{2}$ hour, the whole is cooled and the product of the reaction is filtered, washed with alcohol and dried. The dyestuff thus obtained is also a tribromindigo.

Instead of brominating indigo itself, as in the foregoing examples, the manufacture of tribromo derivatives of indigo may obviously be effected by further brominating the mono- or dibromo substitution products.

Example III. 5 parts of dibromindigo, 50 parts of nitrobenzene and 2 to 2,5 parts of bromin are heated in a reflux apparatus in an oil bath in the course of an hour to 225° C. and maintained during about $1\frac{1}{2}$ to 2 hours at a temperature of 226 to 228° C. (temperature of the oil bath). Much hydrogen bromid is evolved during the heating. After cooling, the separated product of the reaction is filtered, washed with alcohol and dried and thus obtained in the form of a blue crystalline powder of a similar character as the tribromo derivative derived directly from the indigo.

What I claim is:

1. The described process for the manufacture of tribromo derivatives of indigo, which process consists in heating indigo, mono- and dibromindigo with bromin in the presence of a suitable indifferent medium.

2. The described process for the manufacture of tribromo derivatives of indigo, which process consists in treating indigo, mono- and dibromindigo with bromin in the presence of nitrobenzene.

3. As new products, the described tribromo derivatives of indigo corresponding to the formula $C_{16}H_7O_2N_2Br_3$, constituting in dry state from dark blue to brownish-violet powders, insoluble in water, difficultly soluble in cold anilin and nitrobenzene, more easily in hot anilin and nitrobenzene with a blue to bluish-violet color, dissolving in concentrated sulfuric acid with blue color, and yielding yellowish vats by treatment with suitable reducing agents.

4. As a new article of manufacture, the described tribromo derivative of indigo which can be obtained by heating indigo with bromin in the presence of nitrobenzene, which product dissolves in concentrated sulfuric acid with a greenish-blue and in fuming sulfuric acid of 24 p. c. $SO_3$ with a deep blue color, is difficultly soluble in hot anilin with a blue color and in hot nitrobenzene with a blue-violet color and yields by treatment with potassium hydrosulfite a greenish yellow vat, from which unmordanted cotton is dyed in beautiful blue shades, fast to washing, light and chlorin.

In witness whereof I have hereunto signed my name this 2 day of March 1907, in the presence of two subscribing witnesses.

GADIENT ENGI.

Witnesses:
GEO. GIFFORD,
AMAND BRAUN.